United States Patent
Burnette et al.

(10) Patent No.: US 9,769,279 B2
(45) Date of Patent: Sep. 19, 2017

(54) CONTROLLING THE PRE-DELIVERY OF CONTENT TO A MOBILE DEVICE

(71) Applicant: Opanga Networks, Inc., Seattle, WA (US)

(72) Inventors: John Burnette, Seattle, WA (US); Jeff Harrang, Seattle, WA (US); Ben Hadorn, Seattle, WA (US); David Gibbons, Seattle, WA (US)

(73) Assignee: OPANGA NETWORKS, INC., Seattle, WA (US)

( * ) Notice: Subject to any disclaimer, the term of this patent is extended or adjusted under 35 U.S.C. 154(b) by 165 days.

(21) Appl. No.: 14/666,213

(22) Filed: Mar. 23, 2015

(65) Prior Publication Data
US 2015/0271288 A1  Sep. 24, 2015

Related U.S. Application Data

(60) Provisional application No. 61/969,198, filed on Mar. 23, 2014.

(51) Int. Cl.
*H04L 29/08* (2006.01)
*H04W 4/18* (2009.01)

(52) U.S. Cl.
CPC .......... *H04L 67/2847* (2013.01); *H04L 67/04* (2013.01); *H04L 67/06* (2013.01); *H04L 67/26* (2013.01); *H04L 67/327* (2013.01); *H04W 4/18* (2013.01)

(58) Field of Classification Search
None
See application file for complete search history.

(56) References Cited

U.S. PATENT DOCUMENTS

| | | | | |
|---|---|---|---|---|
| 7,500,010 | B2 * | 3/2009 | Harrang | H04L 1/0002 370/232 |
| 7,978,711 | B2 * | 7/2011 | Harrang | H04H 20/42 370/231 |
| 8,676,882 | B2 * | 3/2014 | Georgis | H04N 7/17309 709/203 |
| 9,172,643 | B2 * | 10/2015 | Harrang | H04L 47/10 |
| 9,363,185 | B2 * | 6/2016 | Harrang | H04L 43/0888 |
| 2007/0089110 | A1 | 4/2007 | Li | |
| 2008/0005695 | A1 * | 1/2008 | Ozzie | G06F 17/30867 715/811 |
| 2008/0201332 | A1 * | 8/2008 | Souders | G06F 17/30867 |
| 2009/0222117 | A1 * | 9/2009 | Kaplan | G06Q 30/0601 700/94 |

(Continued)

OTHER PUBLICATIONS

International Search Report and Written Opinion for PCT/US2015/022078, filed Mar. 23, 2015.

*Primary Examiner* — Thomas Dailey

(57) ABSTRACT

Systems and methods for controlling pre-delivery of content to user devices, such as mobile devices, from remote content servers (e.g., content delivery nodes over a network) are described. In some embodiments, the systems and methods receive an indication that a content item at a remote content server is available for pre-delivery to a mobile device over a mobile network, determine the mobile device is associated with sufficient content delivery credit to pre-deliver at least a fraction of the content item to the mobile device, and cause the at least fraction of the content item to be pre-delivered to the mobile device based on the determination.

17 Claims, 4 Drawing Sheets

(56) References Cited

U.S. PATENT DOCUMENTS

| | | |
|---|---|---|
| 2009/0248858 A1 | 10/2009 | Sivasubramanian et al. |
| 2009/0287750 A1 | 11/2009 | Banavar et al. |
| 2010/0174735 A1* | 7/2010 | Fiatal ................ G06F 17/30106 707/769 |
| 2012/0271904 A1 | 10/2012 | Black et al. |
| 2013/0054729 A1 | 2/2013 | Jaiswal et al. |
| 2014/0011538 A1 | 1/2014 | Mulcahy et al. |
| 2015/0207691 A1* | 7/2015 | Price .................. H04L 67/2847 709/217 |

* cited by examiner

CONTROLLING THE PRE-DELIVERY OF CONTENT TO A MOBILE DEVICE

CROSS-REFERENCES TO RELATED APPLICATIONS

This application claims priority to U.S. Provisional Application No. 61/969,198 filed on Mar. 23, 2014 titled METHOD AND SYSTEM FOR VIRTUAL OFFLOAD CREDIT, and is hereby incorporated by reference in its entirety.

BACKGROUND

Many user devices include and support a varied suite of mobile applications, or "apps," enabling users to download and install many different applications to their user devices. The different applications, some of which include components configured to present content to users, may have different or custom online content interfaces and retrieval/delivery protocols. Additionally, the applications may request for and receive content (e.g., video content, audio content, and so on) from various different online, networked, and/or remote content sources, such as content delivery networks (CDNs), remote content servers, remote content storage sites, and so on.

Content is often delivered from remote content servers or associated edge caches to requesting devices (e.g., mobile or other user devices) over a network. Typically, a content provider or other network component utilizes cache controllers and associated algorithms to determine the content delivered to user devices that should be cached, such as content that is predicted to be popular, viral, and/or often requested by user devices. Therefore, when a user device requests delivery of a popular piece of content, the content provider, via the network edge cache, is able to quickly respond and deliver the requested content to the user device from the network edge cache that is proximate to the requesting user device.

Often, the delivery of content to a user device from a remote content source is less than optimal, especially when the user wishes to immediately consume the content. For example, the delivery of content from a remote server to a user device may be slow or ineffective due to limitations at the content source, in the delivery network, and so on.

SUMMARY

Systems and methods for controlling delivery (e.g., pre-delivery) of content to user devices, such as mobile devices, from remote content servers (e.g., content delivery nodes over a network) are described. In some embodiments, the systems and methods receive an indication that a content item at a remote content server is available for pre-delivery to a mobile device over a mobile network, determine the mobile device is associated with sufficient content delivery credit to pre-deliver at least a fraction of the content item to the mobile device, and cause the at least fraction of the content item to be pre-delivered to the mobile device based on the determination.

For example, the systems and methods may identify a total content delivery credit for the mobile device, the total content delivery credit based on previous pre-delivery of content items to the mobile device over non-mobile networks, compare the identified total delivery credit to a delivery cost to pre-deliver the fraction of the content item to the mobile device over the mobile network, and determine there is sufficient content delivery credit to pre-deliver the fraction of the content item to the mobile device when the total content delivery credit is greater than or equal to the delivery cost.

In some embodiments, the systems and methods pre-deliver content to a user device by receiving an indication that a content item at a remote content server is available for pre-delivery to a mobile device over a mobile network, determining that a pre-delivery of content items to the mobile device over non-mobile networks has previously occurred, and causing the at least fraction of the content item to be pre-delivered to the mobile device based on the determination.

DETAILED DESCRIPTION

Figure 1:
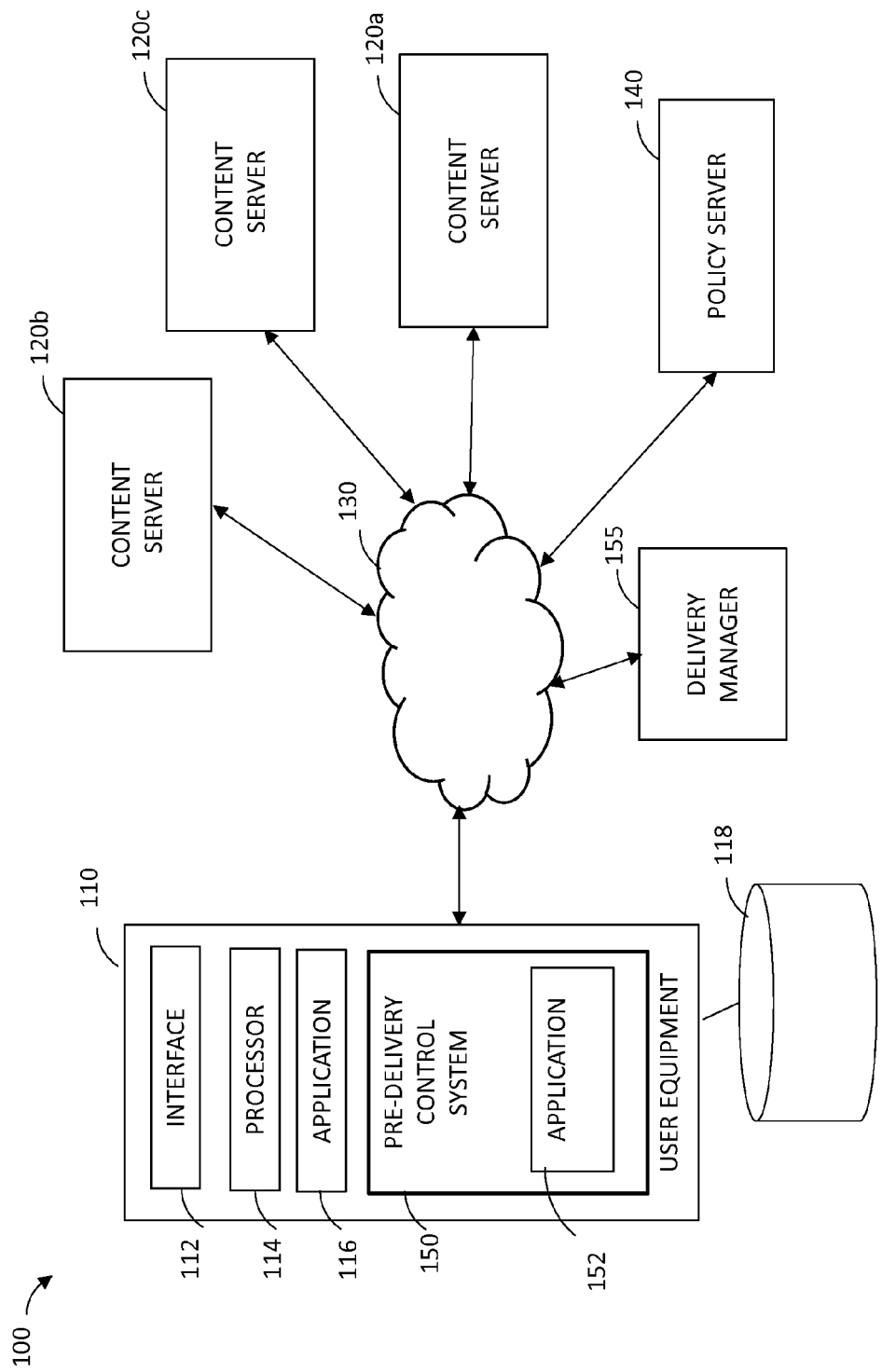
FIG. 1 is a block diagram illustrating a suitable computing environment.

Systems and methods for controlling the pre-delivery of content to a user device, such as by managing content delivery credits for the user device, are described. In some embodiments, the pre-delivery of content may include a delivery or transfer of content items from a remote content server to a user device before a user selects or identifies the content items for playback (or, before the user launches an application associated with the content items). Pre-delivery, therefore, may be the autonomous delivery of certain content items in advance and in anticipation of an application receiving a request from a user to playback the content items via the application.

In order to avoid the problems associated with the delivery of content over networks, systems may proactively pre-deliver media content into user device terminal storage in anticipation of user selection and playback of the content. Pre-caching or pre-delivering content without explicit user requests may mitigate problems associated with network delivery of content, but may lead to new issues for users and/or content delivery networks.

For example, subscribers often have service limits that cap the volume of data they can consume over a time period without incurring overage charges, and if applications on their devices proactively pre-delivery content, such content delivery may push their data volumes over the cap limit. Such overages may prevent or reduce user acceptance of applications that use pre-delivery as a means to improve the user playback experience, among other problems. The systems and methods described herein provide technology to control the pre-delivery of content while ensuring that subscriber service limits are not exceeded, among other things.

In the following detailed description, reference is made to the accompanying drawings, which form a part of the description. The embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

The technology can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term processor refers to one or more devices, circuits, and/or processing cores configured to process data, such as computer program instructions.

A detailed description of embodiments is provided below along with accompanying figures that illustrate the principles of the technology. The technology is described in connection with such embodiments, but the technology should not be limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of illustration and the technology may be practiced according to the claims without some or all of these specific details. For the purpose of clarity, technical material that is known in the technical fields related to the technology has not been described in detail so that the technology is not unnecessarily obscured.

Examples of the Network Environment

FIG. 1 is a block diagram illustrating a suitable network environment 100 for controlling and/or managing the pre-delivery of content to user devices, such as the pre-delivery or anticipated delivery of content to user devices via one or more resident mobile applications of the user device. The network environment 100 includes one or more user equipment or user devices 110, one or more content servers 120a-c, and a policy server 140, that communicate with one another over a data communication network 130.

Any of the machines, databases, or devices shown in FIG. 1 may be implemented in a general-purpose computer modified (e.g., configured or programmed) by software to be a special-purpose computer to perform the functions described herein for that machine, database, or device. Moreover, any two or more of the machines, databases, or devices illustrated in FIG. 1 may be combined into a single machine, and the functions described herein for any single machine, database, or device may be subdivided among multiple machines, databases, or devices.

The content servers 120a-c may provide a variety of different media and other content types, such as video content (e.g., movies, television shows, news programming, video clips), image content (e.g., image or picture slideshows), audio content (e.g., radio programming, music, podcasts), and so on. The content servers 120a-c may deliver, transfer, transport, and/or otherwise provide media files and other content to network edge caches (not shown), which may deliver, transfer, transport, and/or otherwise provide the content to requesting devices (e.g., user equipment 110a-c) via various media transfer protocols (e.g., Hypertext Transfer Protocol (HTTP), File Transfer Protocol (FTP), HTTP Live Streaming (HLS), HTTP Dynamic Streaming (HDS), HTTP Smooth Streaming (HSS), Dynamic Adaptive Streaming over HTTP (DASH), Real Time Streaming Protocol (RTSP), and so on).

The network 130 may be any network that enables communication between or among machines, databases, and devices. Accordingly, the network 130 may be a wide access network (WAN), wired network, a fiber network, a wireless network (e.g., a mobile or cellular network), a cellular or telecommunications network (e.g., WiFi, Global System for Mobile Communications (GSM), Universal Mobile Telecommunications System (UMTS), Long Term Evolution (LTE) network), or any suitable combination thereof. The network 130 may include one or more portions of a private network, a public network (e.g., the Internet), or any suitable combination thereof.

The user equipment 110 may include various types of user devices, such as mobile devices (e.g., laptops, smart phones, tablet computers, and so on), computing devices, set-top boxes, vehicle computing devices, gaming devices, and so on. The user equipment 110a-c may support and run various different operating systems, such as Microsoft® Windows®, Mac OS®, Google® Chrome®, Linux®, Unix®, or any other mobile operating system, including Symbian®, Palm®, Windows Mobile®, Google® Android®, Mobile Linux®, and so on.

The user equipment 110 may also support various components configured to request, receive, display, and/or present content to users associated with the user equipment 110. For example, the user equipment 110 may include applications 116, such as an app, browser, or other component that sends requests for content to content servers 120a-c and presents received content to the users via various display or presentation components, such as a user interface 112. The user equipment 110 may also include a processor 114 and local storage or caches 118, such as a local cache or data store that stores received content (e.g., pre-delivered or device cached content) and provides the stored content to the requesting applications 112. A local cache or storage 118 may be, for example, a storage or memory component contained by the user equipment 110, a detachable storage component that may be attached to the user equipment 110, a storage device associated with a local access network (LAN) that includes the user equipment 110, and/or other storage locations or devices that store media, files, and other data for the user equipment 110 (e.g., a storage location or device that provides storage and is accessible only by a certain or associated user equipment 110).

In some embodiments, the user equipment 110 includes a pre-delivery control system 150 that includes components configured to select and cause delivery (e.g., pre-delivery) of certain content items, such as content items identified as available for pre-delivery via information (e.g., a manifest file) provided by the policy server 140, which stores information associated with mobile applications, content sources, and available content, and provides a customized manifest file to the user equipment 110 that is based on the custom configuration of the applications resident on the user equipment 110.

The pre-delivery control system 150 may receive indications about a subset of the identified content items based on a variety of factors, such as previous usage of the user equipment 110 and/or the applications 116 resident on the user equipment 110, and cause the pre-delivery of content items (or, portions or fractions of content items) of the subset to the user equipment 110.

Further details regarding the discovery of available content and/or the pre-delivery of content may be found in commonly-assigned and co-pending U.S. patent application Ser. No. 14/335,826, filed on Jul. 18, 2014, entitled CONTENT SOURCE DISCOVERY, commonly-assigned and co-pending U.S. patent application Ser. No. 14/212,934, filed on Mar. 14, 2014, entitled PRE-DELIVERY OF CONTENT TO DEVICES, and commonly-assigned and co-pending U.S. patent application Ser. No. 14/448,876, filed on Jul. 31, 2014, entitled PRE-DELIVERY OF CONTENT TO A USER DEVICE, which are hereby incorporated by reference in their entirety.

In some embodiments, the pre-delivery control system 150 includes, provides, and/or supports an application 152, such as an application configured to receive pre-delivered content, provide information about the content and a state of pre-delivery of the content, and playback pre-delivered content items, such as video content, audio content, and so on. The application may include a client, or may communicate with a client (e.g., over an application programming interface), that controls the pre-delivery of content to the application.

The client may include a network monitor that keeps track of what type of serving network is currently connected to the user device 110, such as by periodically calling into a host operating system to identify the connected network (e.g., non-mobile or mobile), as well as pre-delivery agent that manages the actual fetching of pre-delivered content and storing the content into device storage 118.

In some embodiments, the pre-delivery control system 150 may cause the pre-delivery of content to the user equipment 110 based on a variety of factors. For example, the pre-delivery control system 150 may include components configured to pre-deliver, partially or completely, content items associated with (e.g., sharing characteristics with) content currently being played back and/or components configured to pre-deliver content items, partially or completely, content items concurrently during playback of another content item by the mobile application 116 or 152.

The network environment 100 may also include a delivery manager 155, which directs or otherwise manages the delivery of content between devices, such as from the content servers 120a-c to the user equipment 110, from the user equipment 110 to the content servers 120a-c, between user equipment, between content servers (e.g., from content server 120b to content server 120c), and so on. The delivery manager 155 may, when instructed, track, store, and/or provide information associated with various network delivery policies and/or protocols utilized during the delivery of content over the network 130. Although the delivery manager 155 is depicted as being separate from the content servers 120a-c, any of the content servers 120a-c and/or the policy server 140 may include some or all components of the delivery manager 155. Additionally, in some configurations, the delivery manager 155 and/or the content servers 120a-c may include some or all components of the policy server 140. Also, in some embodiments, various components of and functions performed by the delivery manager 155 and/or the policy server 140 may be included in the delivery engine and/or the content playback system 150.

In some embodiments, the delivery manager 155 directs or manages the delivery of content via a delivery policy that utilizes or uses surplus network bandwidth or surplus network capacity. A surplus of network bandwidth or network capacity may be network bandwidth or network capacity that is determined to be available (e.g., unused or idle or free) in a network in view of the total capacity of the network and/or and the total usage of the network. In some embodiments, a network provider determines the amount of surplus network capacity available in a network in view of the total capacity of the network and/or and the total usage of the network. The surplus network capacity may be determined statically or dynamically, and, therefore, a determined surplus network capacity for a network may vary substantially and/or randomly over time (e.g., during peak use periods), for long or short time scales, and/or between one service provider to another.

The surplus capacity, therefore, may be the free bandwidth or capacity between an actual and/or current usage of the bandwidth a total capacity (or, a predetermined percentage of the total capacity). Therefore, the delivery manager 155 may direct or manage the delivery of content between content providers 120a-c, network edge caches (not shown), and user equipment 110 over various selected delivery policies or protocols that utilize free, available, idle, or otherwise surplus bandwidths or capacities of networks, such as paths or protocols that deliver data over currently underused networks that would not otherwise be in use, and/or without substantially impacting or altering the transport performance associated with other data traffic sharing the network.

Further details regarding the delivery of content using surplus network capacity may be found in commonly-assigned U.S. Pat. No. 7,500,010, issued on Mar. 3, 2009, entitled ADAPTIVE FILE DELIVERY SYSTEM AND METHOD, U.S. Pat. No. 8,589,585, issued on Nov. 19, 2013, entitled ADAPTIVE FILE DELIVERY SYSTEM AND METHOD, U.S. Published Patent Application No. 2010/0198943, filed on Apr. 15, 2010, entitled SYSTEM AND METHOD FOR PROGRESSIVE DOWNLOAD USING SURPLUS NETWORK CAPACITY, and U.S. Published Patent Application No. 2013/0124679, filed on Jan. 3, 2013, entitled SYSTEM AND METHOD FOR PROGRESSIVE DOWNLOAD WITH MINIMAL PLAY LATENCY, all of which are hereby incorporated by reference in their entirety.

Examples of Controlling the Pre-Delivery of Content to User Devices

As described herein, in some embodiments, the pre-delivery control system 150 controls the pre-delivery of content items (or, fractions of the content items), based on managing and/or applying content delivery credits (e.g., earned during previous or historical pre-delivery instances) to requested or immediate pre-delivery events.

Figure 2:
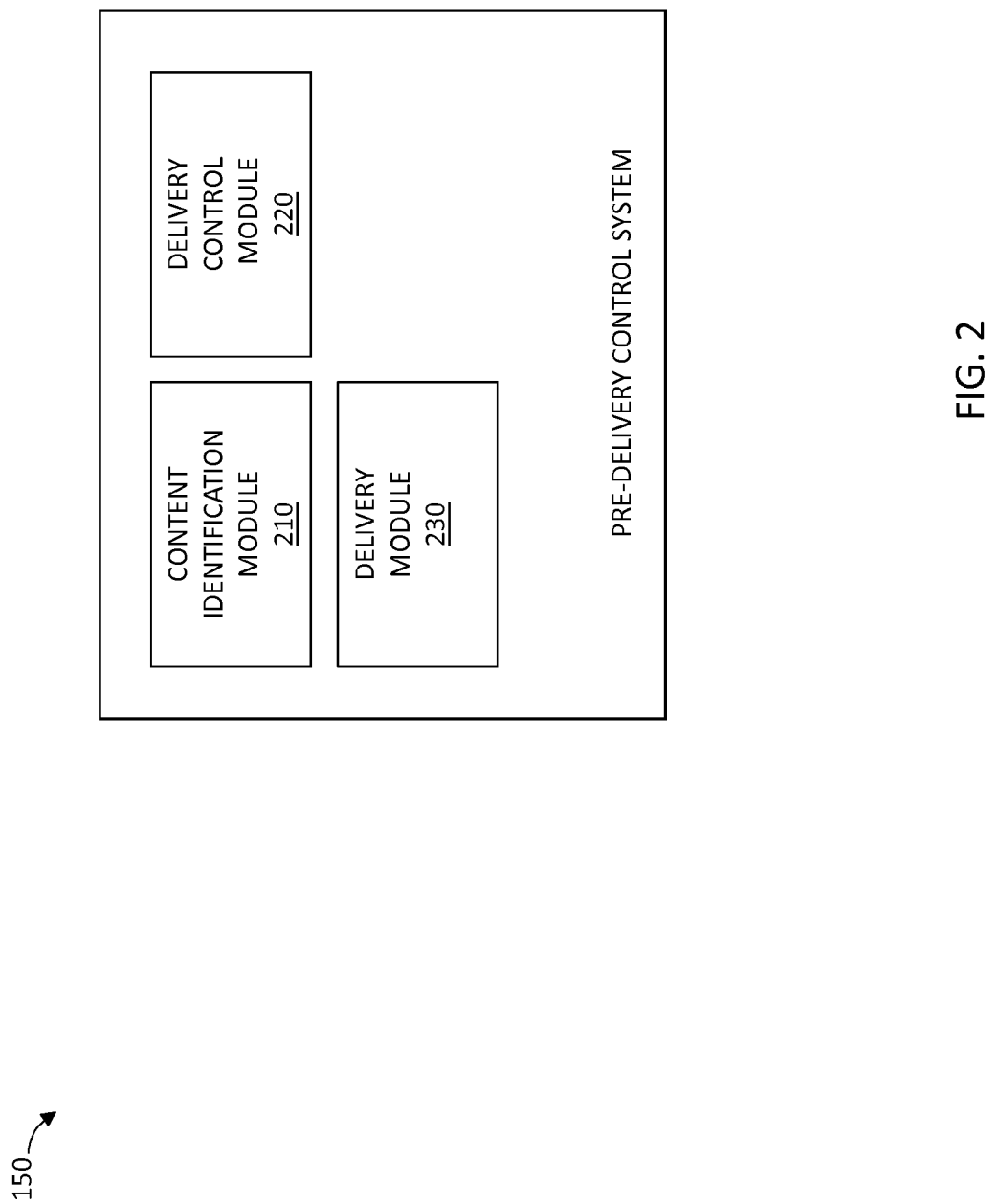
FIG. 2 is a block diagram illustrating components of a pre-delivery control system.

FIG. 2 is a block diagram illustrating the components of the pre-delivery control system 150. The pre-delivery control system 150 may include one or more modules and/or components to perform one or more operations of the pre-delivery control system 150. The modules may be hardware, software, or a combination of hardware and software, and may be executed by one or more processors. For example, the pre-delivery control system 150 may include a content indication module 210, a delivery control module 220, and a delivery module 230.

In some embodiments, the content indication module 210 is configured and/or programmed to receive an indication that a content item at a remote content server is available for pre-delivery to a mobile device over a mobile network. For example, the content indication module 210 may receive information from the policy server 140 and/or from one or more content servers 120a-c that identifies content available for pre-delivery to the mobile device 110, such as content (e.g., video, audio, text, binary or combinations) predicted to be of interest to a user of the mobile device 110.

In some embodiments, the delivery control module 220 is configured and/or programmed to determine the mobile device is associated with sufficient content delivery credit to pre-deliver at least a fraction of the content item to the mobile device. For example, the delivery control module 220 may compare a total content delivery credit, which is based on previous pre-delivery of content items to the mobile device over non-mobile networks, to a delivery cost to pre-deliver the fraction of the content item to the mobile device over the mobile network, and determine there is sufficient content delivery credit to pre-deliver the fraction of the content item to the mobile device when the total content delivery credit is greater than or equal to the delivery cost.

In some embodiments, the delivery control module 220 may determine the total content delivery credit is sufficient when the content delivery credit is greater than zero bytes of data, where the delivery credit is associated with a number of bytes earned by the mobile device during previous pre-delivery of content items to the mobile device over non-mobile networks.

In some embodiments, the delivery module 230 is configured and/or programmed to cause the at least fraction of the content item to be pre-delivered to the mobile device, based on the determination. For example, the delivery module 230 may cause the content servers 120a-c to transit, send, or otherwise deliver the content item (or, a fraction of the content item) to local storage 118 of the mobile device, before an application 116 or 152 receives a request from a user to playback the content item.

In some embodiments, the pre-delivery of at least a fraction of a content items causes an initial part (e.g., 10% or 2 minutes or 3 MBytes or an intro scene or pre-roll ad) of a total content file has been delivered to the mobile device 110 before a playback request is made or input by a user of the mobile device 110. The pre-delivered fraction may be sufficient to provide a quick start to playback when a user initiates playback, and may sufficient to span time intervals when the delivery network is unable to keep up with the playback rate (e.g., while the remaining portion of the content item is delivered after playback commences).

The effect of fractional pre-delivery obviates initial playback delays for buffering, in that the beginning part of the content file is immediately available from local storage, and provides additional protection against video freezes, stalls or rebuffering delays during playback (e.g., the playback pointer in the content file remains behind the delivered end-of-file pointer throughout playback).

After, content is (partially), pre-delivered and/or consumed, the delivery control module 220 may debit the content delivery credit of the mobile device a credit value equivalent to a size of the at least fraction of the content item.

Figure 3:
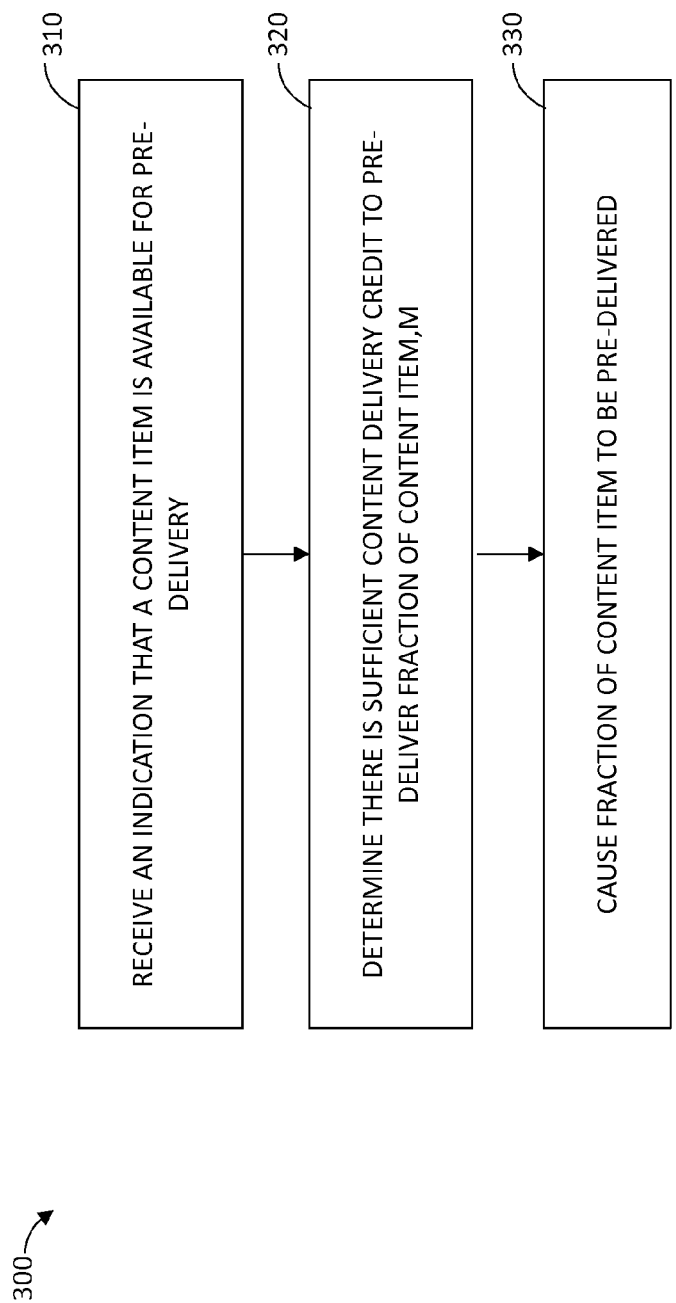
FIG. 3 is a flow diagram illustrating a method for pre-delivering content to a user device.

As described herein, in some embodiments, the pre-delivery control system 150 may perform various processes and/or operations when controlling the pre-delivery of content to the user device 110. FIG. 3 is a flow diagram illustrating a method 300 for pre-delivering content to a user device. The method 300 may be performed by the pre-delivery control system 150 and, accordingly, is described herein merely by way of reference thereto. It will be appreciated that the method 300 may be performed on any suitable hardware.

In operation 310, the pre-delivery control system 150 receives an indication that a content item at a remote content server is available for pre-delivery to a mobile device over a mobile network. For example, the content indication module 210 may receive information from the policy server 140, and/or from one or more content servers 120a-c that identifies content available for pre-delivery to the mobile device 110.

In operation 320, the pre-delivery control system 150 determines the mobile device is associated with sufficient content delivery credit to pre-deliver at least a fraction of the content item to the mobile device. For example, the delivery control module 220 may compare a total content delivery credit, which is based on previous pre-delivery of content items to the mobile device over non-mobile networks, to a delivery cost to pre-deliver the fraction of the content item to the mobile device over the mobile network, and determine there is sufficient content delivery credit to pre-deliver the fraction of the content item to the mobile device when the total content delivery credit is greater than or equal to the delivery cost.

Figure 4:
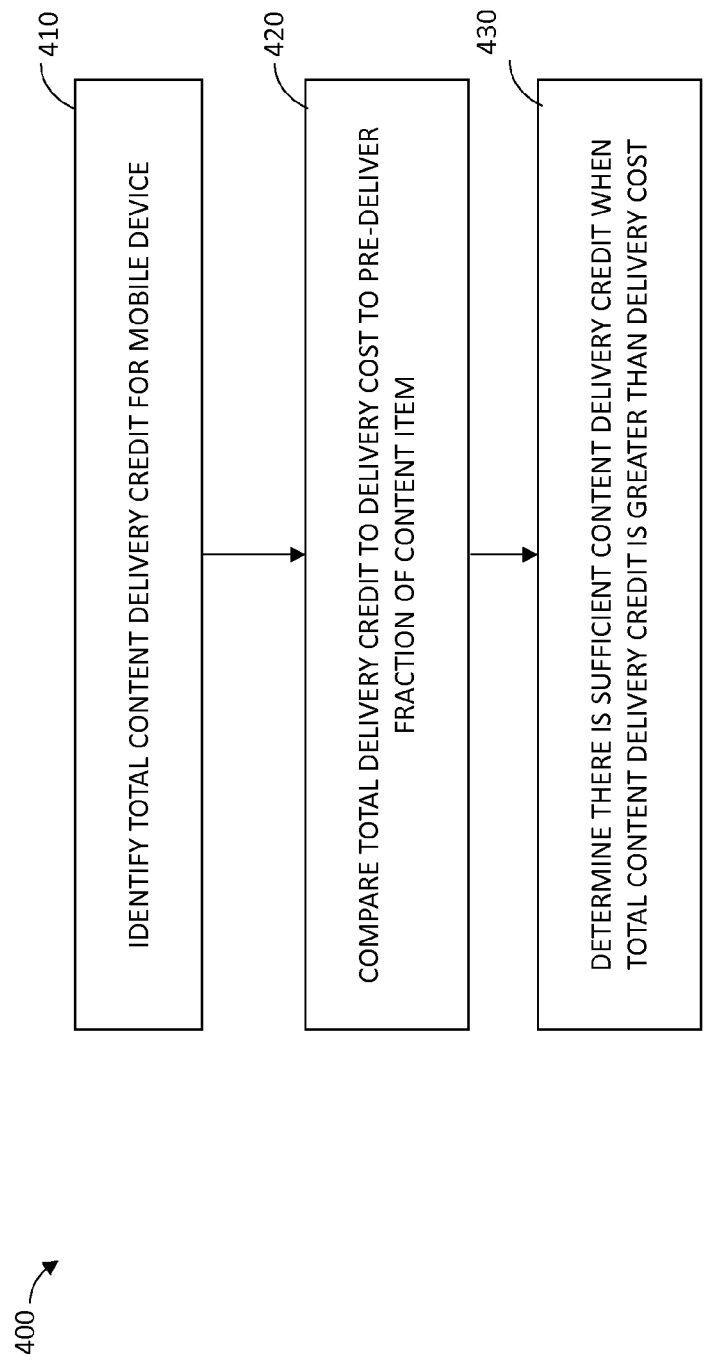
FIG. 4 is a flow diagram illustrating a method for determining a mobile device has sufficient content delivery credit for pre-delivering content to the mobile device.

FIG. 4 illustrate a method 400 for determining a mobile device has sufficient content delivery credit for pre-delivering content to the mobile device. The method 400 may be performed by the pre-delivery control system 150 and, accordingly, is described herein merely by way of reference thereto. It will be appreciated that the method 400 may be performed on any suitable hardware.

In operation 410, the pre-delivery control system 150 identifies a total content delivery credit for the mobile device, the total content delivery credit based on previous pre-delivery of content items to the mobile device over non-mobile networks. For example, the pre-delivery control system 150 may identify a total number of bytes previously pre-delivered to the mobile device (minus any debited bytes) over non-mobile networks to be 250 MB. Therefore, a current total, or net, content delivery credit for the mobile device is 250 MB.

In operation 420, the pre-delivery control system 150 compares the identified total delivery credit to a delivery cost to pre-delivery the fraction of the content item to the mobile device over the mobile network. Following the example, the pre-delivery control system 150 identifies a delivery cost (known or expected) to pre-deliver the fraction of the content item to be 100 MB.

In operation 430, the pre-delivery control system 150 determines there is sufficient content delivery credit to pre-deliver the fraction of the content item to the mobile device when the total content delivery credit is greater than or equal to the delivery cost. Following the example, the pre-delivery control system 150 determines that the total content delivery credit (250 MB) is larger than the delivery cost (100 MB).

Referring back to FIG. 3, in operation 330, the pre-delivery control system 150 causes the at least fraction of the content item to be pre-delivered to the mobile device based on the determination. For example, the delivery module 230 may cause the content servers 120a-c to transit, send, or otherwise deliver the content item (or, a fraction of the content item) to local storage 118 of the mobile device, before an application 116 or 152 receives a request from a user to playback the content item.

In some embodiments, the pre-delivery control system 150 debits the content delivery credit of the mobile device a credit value equivalent to a size of the at least fraction of the content item once the at least fraction of the content item is pre-delivered to the mobile device and/or once the content item pre-delivered to the mobile device is consumed by a media presentation client of the mobile device.

Thus, as described herein, the pre-delivery of content increases online time opportunities for transferring content to the mobile device 110 because, during the pre-delivery, a user is not required to be concurrently consuming the same content, as is the case with traditional streaming media delivery. For example, time opportunities when the mobile device 110 is attached online to a non-mobile network (e.g., home wireless network) increases the effectiveness of a virtual wireless offload when used with pre-delivery.

Content delivery periods, therefore, may be divided into two classes: times when the mobile device 110 is connected via a non-mobile network (e.g., WiFi, cable, DSL, or other non-subscriber networks) and times when the mobile device 110 is connected via a mobile network (e.g., 2G, 3G, HSPA, LTE, and so on). Further, the online media consumption periods, or time periods when the user is watching content, may also be divided into two classes, plus two classes for when media is never consumed.

Table 1 illustrates various scenarios associated with the pre-delivery and consumption of content to the mobile device 110:

TABLE 1

Delivery Scenarios

|  |  | Consumed Media | | Unconsumed Media |
|---|---|---|---|---|
|  |  | Non-Mobile | Mobile | Mobile or Non-Mobile |
| Delivered Media | Non-Mobile | S11 | S12 | S13 |
|  | Mobile | S21 | S22 | S23 |

As described herein, "non-mobile" may refer to any network where the data usage is not counted towards the users' mobile service usage (or otherwise billed to the user). Thus, "non-mobile" networks may include embedded small cells in a mobile operator's larger macro-area coverage network (e.g., WiFi hotspots, micro/pico/femto-cells, home gateways, and so on). In some cases, "non-mobile" networks may also refer to mobile networks during times where content is delivered using techniques that do not impact the network congestion, such as preferential surplus-capacity transport directed by the delivery manager 155 depicted in FIG. 1.

Referring to Table 1, when a video media file was first delivered over a non-mobile network (e.g., WiFi), but then watched (or otherwise consumed) while the user was still connected to the same or a different non-mobile network (e.g., WiFi) network, the corresponding scenario state is S11. The user's mobile network usage accounting may be affected in scenarios S12 and S21, where the consumption event occurs while the user terminal is attached to a mobile network. Also, when content is delivered, but never gets consumed (e.g., scenarios S13 and S23), usage accounting may also be affected.

As described herein, when a fraction of a content file is first pre-delivered over a non-mobile network (e.g., WiFi) and then later selected and watched while the mobile device 110 is served by a mobile network (e.g., LTE), then only the remaining non-pre-delivered fraction of the content file needs to be delivered over the mobile network (e.g., scenario S12) in order to complete the playback. Thus, the mobile network does not deliver the pre-delivered fraction as the user watches the content.

In this scenario, the pre-delivery control system 150 credits a content delivery account for the mobile device 110 the amount of content that was pre-delivered over the non-mobile network, as the user mobile usage was reduced by this amount (e.g., measured in bytes or an equivalent unit of usage accounting) that would otherwise be delivered during the playback.

However, when content is pre-delivered when the mobile device 110 is connected to and served by a mobile network (e.g., S21 or S22), then the the pre-delivery control system 150 debits the content delivery account for the mobile device 110 the amount that was pre-delivered, because the pre-delivered content may count against the user's data cap, and may or may not be consumed by the user at a later time. Thus, debits may be used to offset credits, resulting in a net content delivery credit for the mobile device.

In some embodiments, the pre-delivery control system 150 may not debit the content delivery account until content is either consumed or deleted without ever having been consumed (e.g., unwatched content S13 and S23), and/or may not debit the content delivery account when the content is both delivered and consumed on mobile (e.g., S22).

In some embodiments, the pre-delivery control system may cause content to be pre-delivered when connected to a mobile network as long as there is sufficient content delivery credit to deliver a suitable fraction of the content. For example, sufficient credit may be defined as zero or greater, or some threshold (e.g., the untallied potential debt), and credit may be accumulated whenever the mobile device consumes content that was pre-delivered via non-mobile networks (e.g., S12).

In some embodiments, the pre-delivery control system 150 may defer the pre-delivery of content when connected to a mobile network when insufficient credit is available, until the mobile device 110 is attached to a non-mobile network, or until enough content delivery credit is obtained by the mobile device 110. Thus, the pre-delivery control system 150 controls the pre-delivery of content to the mobile device 110 when the device is connected to a mobile network, without risking a user's data service exceeding their mobile service data cap due to the pre-delivery of content.

For example, Table 2 illustrates in an embodiment the crediting/debiting of a content delivery account for a mobile device:

TABLE 1

Pre-Cache Credit/Debit Scenarios

|  |  | Consumed Media | | Unconsumed Media |
|---|---|---|---|---|
|  |  | Non-Mobile | Mobile | Mobile or Non-Mobile |
| Delivered Media | Non-Mobile | IGNORE | (CREDIT) | IGNORE |
|  | Mobile | (DEBIT) | IGNORE | (DEBIT) |

In some embodiments, excess credit may be available when the user's usage counters associated with their mobile service are reset. For example, the pre-delivery control system 150 may reset excess credit to zero at billing cycle time boundaries. Alternatively, the credit may be reset to a positive value to allow the pre-delivery control system 150 to increase data usage by a controlled amount. Also, the pre-delivery control system 150 may be configurable by the user so that the billing cycle dates are known in advance, or the service provider may be queried to determine the usage billing reset intervals.

Thus, the pre-delivery control system 150 may preserve the users' data cap without any (or minimal) involvement of a network operator or other external service provider, allowing one or more application that pre-deliver content preemptively pre-deliver content, while guaranteeing that the users' mobile data bills are not impacted by the pre-delivery events.

In some embodiments, the pre-delivery control system 150 may include an interface or application programming interface to report the credit/debit status to the user. The pre-delivery control system 150 may maintain the state of content delivery credit or debit (e.g., a content delivery credit account), or may communicate with a remote management server that can be queried to determine the content delivery credit account prior to the pre-delivery of content, where the pre-delivery control system 150 reports credit and debit transactions as they occur, or periodically, to the remote management server.

The pre-delivery control system 150 may collect and maintain credit and debit information on behalf of one or several applications running on the user device 110 to manage the overall pre-delivery policy of multiple applications of the user device 110.

Thus, in some embodiments, a pre-delivery client of a mobile device may receive an indication that a content item at a remote content server is available for pre-delivery to a mobile device over a mobile network, determine that a pre-delivery of content items to the mobile device over non-mobile networks has previously occurred, and cause the at least fraction of the content item to be pre-delivered to the mobile device based on the determination.

Although aspects of the present technology have been described with respect to specific examples, embodiments of the present technology are not limited by these examples. For example, persons of skill in the art will recognize that pre-delivering content to user devices may be performed according to various other algorithms and processes without departing from the scope or spirit of the present technology.

What is claimed is:

1. A method, comprising:
    receiving an indication that a content item at a remote content server is available for pre-delivery to a mobile device over a mobile network;
    determining the mobile device is associated with sufficient content delivery credit to pre-deliver at least a fraction of the content item to the mobile device; and
    causing the at least fraction of the content item to be pre-delivered to the mobile device based on the determination,
    wherein the content delivery credit is a number of bytes earned by the mobile device during previous pre-delivery of content items to the mobile device over non-mobile networks.

2. The method of claim 1, wherein determining the mobile device is associated with sufficient delivery credit to pre-deliver at least a fraction of the content item to the mobile device includes:
    identifying a total content delivery credit for the mobile device;
    comparing the identified total content delivery credit to a delivery cost to pre-delivery the fraction of the content item to the mobile device over the mobile network; and
    determining there is sufficient content delivery credit to pre-deliver the fraction of the content item to the mobile device when the total content delivery credit is greater than or equal to the delivery cost.

3. The method of claim 1, wherein determining the mobile device is associated with sufficient delivery credit to pre-deliver at least a fraction of the content item to the mobile device includes determining the total content delivery credit is greater than zero bytes of data.

4. The method of claim 1, wherein the content delivery credit is based on previous pre-delivery of content items to the mobile device over non-mobile networks.

5. The method of claim 1, wherein determining the mobile device is associated with sufficient delivery credit to pre-deliver at least a fraction of the content item to the mobile device includes determining there is sufficient delivery credit to pre-deliver all of the content item; and
    wherein causing the at least fraction of the content item to be pre-delivered to the mobile device based on the determination includes causing all of the content item to be pre-delivered to the mobile device.

6. The method of claim 1, wherein receiving an indication that a content item at a remote content server is available for pre-delivery to a mobile device over a mobile network includes receiving the indication when the mobile device is currently connected to a mobile network of which a user of the mobile device is a subscriber; and
    wherein determining the mobile device is associated with sufficient delivery credit to pre-deliver at least a fraction of the content item to the mobile device includes determining the mobile device is associated with content delivery credit for previous pre-delivery of content items to the mobile device over one or more wireless networks.

7. The method of claim 1, further comprising:
    debiting the content delivery credit of the mobile device a credit value equivalent to a size of the at least fraction of the content item once the at least fraction of the content item is pre-delivered to the mobile device.

8. The method of claim 1, further comprising:
    debiting the content delivery credit of the mobile device a credit value equivalent to a size of the at least fraction of the content item once the at least fraction of the content item pre-delivered to the mobile device is consumed by a media presentation client of the mobile device.

9. A system for pre-delivering content to a mobile device, the system comprising:
    one or more processors;
    a content indication module that receives an indication that a content item at a remote content server is available for pre-delivery to a mobile device over a mobile network, the content indication module being executed by the one or more processors;
    a delivery control module that determines the mobile device is associated with sufficient content delivery credit to pre-deliver at least a fraction of the content item to the mobile device, the delivery control module being executed by the one or more processors; and
    a delivery module that causes the at least fraction of the content item to be pre-delivered to the mobile device based on the determination, the delivery module being executed by the one or more processors,
    wherein the content delivery credit is a number of bytes earned by the mobile device during previous pre-delivery of content items to the mobile device over non-mobile networks.

10. The system of claim 9, wherein the delivery control module is configured to:
    identify a total content delivery credit for the mobile device;

compare the identified total delivery credit to a delivery cost to pre-delivery the fraction of the content item to the mobile device over the mobile network; and determine there is sufficient content delivery credit to pre-deliver the fraction of the content item to the mobile device when the total content delivery credit is greater than or equal to the delivery cost.

11. The system of claim 9, wherein the delivery control module determines the total content delivery credit is greater than zero bytes of data.

12. The system of claim 9, wherein the delivery control module determines there is sufficient delivery credit to pre-deliver all of the content item; and wherein the delivery module causes all of the content item to be pre-delivered to the mobile device.

13. The system of claim 9, wherein the content indication module receives the indication when the mobile device is currently connected to a mobile network of which a user of the mobile device is a subscriber; and wherein the delivery control module determines the mobile device is associated with content delivery credit for previous pre-delivery of content items to the mobile device over one or more wireless networks.

14. The system of claim 9, wherein the delivery control module debits the content delivery credit of the mobile device a credit value equivalent to a size of the at least fraction of the content item once the at least fraction of the content item is pre-delivered to the mobile device.

15. The system of claim 9, wherein the delivery control module debits the content delivery credit of the mobile device a credit value equivalent to a size of the at least fraction of the content item once the at least fraction of the content item pre-delivered to the mobile device is consumed by a media presentation client of the mobile device.

16. A non-transitory computer-readable storage medium whose contents, when executed by a client of a mobile device, cause the client of the mobile device to perform operations for pre-delivering content to the mobile device, the operations comprising:

receiving an indication that a content item at a remote content server is available for pre-delivery to a mobile device over a mobile network;

determining that a pre-delivery of content items to the mobile device over non- mobile networks has previously occurred; and causing the at least fraction of the content item to be pre-delivered to the mobile device based on the determination, wherein the content delivery credit is a number of bytes earned by the mobile device during previous pre-delivery of content items to the mobile device over non-mobile networks.

17. The non-transitory computer-readable storage medium of claim 16, wherein determining that a pre-delivery of content items to the mobile device over non-mobile networks has previously occurred includes identifying a content delivery credit for the mobile device is greater than zero.

* * * * *